Patented Oct. 7, 1930

1,777,835

UNITED STATES PATENT OFFICE

ANTONIO FERRETTI, OF MILAN, ITALY, ASSIGNOR TO SOCIETÁ INVENZIONI BREVETTI ANONIMA TORINO, OF TURIN, ITALY

TREATING OF ANIMAL-SKIN PRODUCTS

No Drawing. Original application filed May 24, 1929, Serial No. 365,780, and in Italy July 14, 1928. Divided and this application filed July 15, 1930. Serial No. 468,125.

This invention relates to a process of treating animal skin materials or animal skin products, as distinguished from the treatment of wool, hair, etc., and has for one of its objects the provision of a process adapted for treating tanned animal skin products such as scraps and cuttings from tanned hides, for example, whereby such materials may be converted into a useful and valuable product which in appearance, fibrous texture and flexibility resembles natural leather.

It will be apparent that my invention is of economical value in that it salvages or utilizes materials which heretofore may have been simply thrown away.

In the practice of my invention the material to be treated is intimately and mechanically admixed with an aqueous medium until a thin, flowing slurry of the fibers in aqueous suspension is obtained. The proportion of aqueous medium to the material being treated is necessarily large so as to obtain the desired thin flowing mass or slurry.

If the material being treated is, for example, cuttings and scraps of chrome tanned leather from which the acid has not yet been removed, the material is first subjected to a preliminary neutralization by treatment with an alkaline salt of a weak acid, such as neutrol (⅔ bicarbonate of soda and ⅓ sodium sulphate), borate of sodium, sodium hyposulfite, bicarbonate of soda, either separately or combined, at a temperature between 30 and 60° C., for example. This material is then washed and next admixed with an aqueous medium until the thin flowing slurry above referred to is obtained.

To this slurry is added a suitable grease capable of emulsifying when added to water, ammonium chloride, a vegetable tannin and a suitable binding material containing a water insoluble binder, the binding material being miscible with water prior to the coagulation of the binder, as for example rubber latex, gutta percha latex, balata latex or the like as obtained from trees or plants which may have been preserved by ammonia or other suitable alkaline preserving material. A synthetic latex, or other binding material containing a water insoluble binder which is in suitable condition for incorporation in the slurry, however, may be used satisfactorily. The latex or other binding material employed is added to the aqueous slurry after the addition of the grease and after the addition of the vegetable tannin.

The vegetable tannin is added as a preservative of the binder in the product so that vulcanization may be dispensed with if desired.

The slurry thus produced is then caused to flow upon a perforated support and the liquid of the slurry abstracted so that a sheet of fibers is obtained. This material is then rolled and pressed and subjected to the usual finishing operations employed in the finishing of natural leathers.

I have mentioned above the addition of ammonium chloride to the slurry. This material is employed to promote the abstracting of the liquid of the slurry when sheets of substantial thickness are desired in the finished product. It is to be understood that the amount of ammonium chloride employed will vary depending upon the material being treated and also upon the separation or abstraction of the liquid of the slurry that is desired. I have found also that the addition of this ammonium chloride improves the process and the product.

In the practice of my invention some care must be exercised when employing rubber latex, for instance, as a binding material so as not to allow coagulation of the binder to proceed to a detrimental degree before the liquid of the slurry is abstracted, inasmuch as such detrimental coagulation renders the practice of the process and the properties of the resulting product unsatisfactory. If I employ latex as a binding material, I prefer to abstract the liquid of the slurry within an hour of the addition of the binding material to the slurry.

This application is a division of my co-pending application Serial No. 365,780, filed May 24, 1929.

What I claim is:—

1. The process which comprises treating mineral tanned animal skin products with a neutralizing agent, washing, effecting an intimate admixture of the material thus obtained and an aqueous medium until a flowing slurry with the tanned fibers of the animal skin products in suspension is obtained, adding a grease, ammonium chloride, a water insoluble binder and a preservative therefor, and abstracting the liquid from the slurry.

2. The process which comprises treating mineral tanned animal skin products with a neutralizing agent, washing, effecting an intimate admixture of the material thus obtained and an aqueous medium until a flowing slurry with the tanned fibers of the animal skin products in suspension is obtained, adding a grease, vegetable tannin, latex and ammonium chloride to the slurry, and abstracting the liquid of the slurry.

This specification signed this 21 day of June, 1930.

ANTONIO FERRETTI.